United States Patent
Hu et al.

(10) Patent No.: US 7,511,904 B2
(45) Date of Patent: Mar. 31, 2009

(54) PIEZOELECTRICALLY DRIVEN OPTICAL LENS

(75) Inventors: Chao-Chang Hu, Hsinchu (TW);
Han-Wei Su, Hsinchu (TW);
Sheng-Chih Shen, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 11/802,024

(22) Filed: May 18, 2007

(65) Prior Publication Data
US 2008/0088946 A1    Apr. 17, 2008

(51) Int. Cl.
*G02B 7/02*     (2006.01)
*G02B 15/14*   (2006.01)

(52) U.S. Cl. .................. 359/824; 359/823; 359/694

(58) Field of Classification Search ......... 359/694–701, 359/819–824
See application file for complete search history.

(56) References Cited

U.S. PATENT DOCUMENTS

| | | | |
|---|---|---|---|
| 4,755,705 A | 7/1988 | Holum | |
| 4,786,836 A | 11/1988 | Tokushima et al. | |
| 4,829,209 A | 5/1989 | Kawasaki et al. | |
| 4,935,659 A | 6/1990 | Naka et al. | |
| 4,952,834 A | 8/1990 | Okada et al. | |
| 4,959,580 A | 9/1990 | Vishnevsky et al. | |
| 5,013,982 A | 5/1991 | Sasaki et al. | |
| 5,225,941 A * | 7/1993 | Saito et al. | 359/824 |
| 5,490,015 A * | 2/1996 | Umeyama et al. | 359/824 |
| 5,587,846 A * | 12/1996 | Miyano et al. | 359/824 |
| 5,708,872 A | 1/1998 | Fukino et al. | |
| 5,751,502 A | 5/1998 | Watanabe et al. | |
| 5,859,733 A * | 1/1999 | Miyano et al. | 359/824 |
| 5,898,526 A | 4/1999 | Yoshibe et al. | |
| 5,898,528 A | 4/1999 | Fukino et al. | |
| 6,710,950 B2 | 3/2004 | Rouvinen et al. | |
| 6,853,507 B2 | 2/2005 | Ryu et al. | |

FOREIGN PATENT DOCUMENTS

| | | |
|---|---|---|
| JP | 2006-0958587 A | 4/2006 |
| JP | 2006-139039 A | 6/2006 |
| JP | 2006-197743 A | 7/2006 |

* cited by examiner

*Primary Examiner*—Mohammed Hasan
(74) *Attorney, Agent, or Firm*—Birch, Stewart, Kolasch & Birch, LLP

(57) ABSTRACT

A piezoelectrically driven optical lens includes a lens body and a piezoelectric element for generating a rotating force. The lens body includes a hollow base; a lens barrel rotatably positioned in the hollow base; and a lens system disposed in the lens barrel, axially movable by rotation of the lens barrel and configured for zooming or focusing. The piezoelectric element is secured in position in the hollow base and in contact with the outside of the lens barrel to generate a rotating force for rotating the lens barrel. Accordingly, with this simple structure of the piezoelectrically driven optical lens, a drawback of the prior art, that is, structural complexity, can be overcome.

22 Claims, 4 Drawing Sheets

PIEZOELECTRICALLY DRIVEN OPTICAL LENS

BACKGROUND OF THE INVENTION

1. Field of the Invention

The present invention relates to optical lenses, and more particularly, to a piezoelectrically driven optical lens.

2. Description of the Prior Art

British 1 Ltd. Corporation (http://www.1limited.com) has developed a piezoelectric actuator that is helical and curled and made of twin-chip piezoelectric ceramic plates, which, when coupled with an optical lens and a bracket and incorporated into a film camera, digital camera, or camera phone, provides for automatic focus alignment.

Despite its advantages, namely small size, great actuation displacement, low energy consumption, low noise, and high compatibility, the helical, curled piezoelectric actuator does have its own drawbacks. Coiling up twin-chip piezoelectric ceramic plates to form a helical, curled piezoelectric actuator and linking up circuits entail much labor; even if the process is performed with automated machines and tools, the process is complicated and sophisticated, and, therefore, both yield and quality of product will typically be unreliable. Hence, incorporation of the helical, curled piezoelectric actuator in a film camera, digital camera, or camera phone has little industrial applicability because of high manufacturing costs and low yield.

U.S. Pat. Nos. 4,755,705, 4,786,836, 4,829,209, 4,935,659, 4,952,834, 4,959,580, and 5,013,982 disclose technology related to an ultrasonic motor (also known as piezoelectric motor). U.S. Pat. Nos. 5,708,872, 5,751,502, 5,898,526, and 5,898,528 disclose the technology for incorporating an ultrasonic motor (also known as piezoelectric motor) into a conventional camera. Due to the relatively large volume occupied by conventional cameras, it is feasible to fabricate or drive an optical lens, using a known device or technology, such as the aforesaid ultrasonic motor (also known as piezoelectric motor) or the technology thereof. Nonetheless, with digital cameras increasingly replacing conventional cameras, and with camera phone lenses with zooming and focusing functions becoming popular and typical of cellular phones, the aforesaid conventional ultrasonic motor (also known as piezoelectric motor) is too large to be placed inside a digital camera or camera phone. This is the primary reason why the optical lenses of digital cameras and that of camera phones on the market remain relatively large.

U.S. Pat. No. 6,710,950 discloses a piezoelectric actuator for use in digital cameras. The piezoelectric actuator comprises a plurality of piezoelectric elements positioned symmetrically on an outer surface of a fixed support tube and an inner surface of a circuit board. An engagement pad is disposed on the surface of each of the piezoelectric elements. Once the piezoelectric elements are subjected to an applied voltage, the engagement pads synchronize the movement of the lens in the axial direction of the fixed support tube, thereby adjusting the position of the lens. But the technique involves using a plurality of piezoelectric elements and thereby results in high costs and a complicated assembly process, not to mention that it is difficult to achieve precise control of displacement in the course of synchronized movement of the lens.

U.S. Pat. No. 6,853,507 discloses a lens driving device for use in an optical device to move the lens quickly and provide focus adjustment within an effective distance. Unlike U.S. Pat. Nos. 6,710,950, 6,853,507 discloses driving a lens system to move axially inside a lens barrel by means of a helical groove (whereby rotational movement is transformed into axial movement), and U.S. Pat. No. 6,853,507 also discloses a ring-shaped piezoelectric actuation element disposed in the bottom and adapted to enable rotational movement of the lens barrel. In response to an applied voltage, the ring-shaped piezoelectric actuation element is radially contracted or expanded to drive the lens barrel to perform optical focus adjustment or focus alignment. Nevertheless, this patent involves fabricating a plurality of piezoelectric actuation elements each having an inner circumferential surface disposed with a plurality of segments, and thus precise control of the fabrication process is difficult, not to mention that two-way rotational movement cannot be achieved without two ring-shaped piezoelectric actuation elements and two helical grooves oriented in different directions, which accounts for the disadvantages of this patent, such as high costs and a complicated assembly process. Besides, the ring-shaped piezoelectric actuation elements work by means of a surface wave and thereby works inefficiently, and thus the ring-shaped piezoelectric actuation elements disadvantageously slow down rather than speed up an optical device.

In addition to the aforesaid patents, digital cameras and camera phones with small-sized piezoelectrically driven optical lens are disclosed in some papers and at some conferences. However, parts and components of a conventional piezoelectrically driven optical lens have complex structures that require sophisticated processing and therefore are fabricated by unit production instead of batch production. In addition to the fabrication process, the intricate parts and components of the conventional piezoelectrically driven optical lens make the assembly process difficult, which is particularly true when it comes to a piezoelectric stator. Assembling the piezoelectric stator is difficult, and the designs employed typically reduce the driving force of a simple piezoelectrically driven optical lens. Small-sized elements cannot be easily fabricated with an automated machine, leading to increased labor costs and higher manufacturing costs being incurred in their fabrication. In short, despite its advantageous small size, a conventional piezoelectrically driven optical lens does not offer much in the way of cost-competitiveness, commercial value, or industrial applicability.

In view of the aforesaid drawbacks of the prior art, an issue calling for urgent solution is to develop a piezoelectrically driven optical lens characterized by structural simplicity, high torque, small size, strong structure, ease of production, and ease of assembly.

SUMMARY OF THE INVENTION

In light of the aforesaid drawbacks of the prior art, it is a primary objective of the present invention to provide a piezoelectrically driven optical lens having structurally simple parts and components.

Another objective of the present invention is to provide a piezoelectrically driven optical lens occupying minimized volume.

Another objective of the present invention is to provide a piezoelectrically driven optical lens characterized by enhanced torque.

Another objective of the present invention is to provide a piezoelectrically driven optical lens characterized by a strong structure.

Another objective of the present invention is to provide a piezoelectrically driven optical lens characterized by ease of fabrication.

Another objective of the present invention is to provide a piezoelectrically driven optical lens characterized by ease of assembly.

In order to achieve the above and other objectives, the present invention provides a piezoelectrically driven optical lens comprising: a lens body having a hollow base, a lens barrel, and a lens system, wherein the lens barrel is rotatably positioned in the hollow base, the lens system is disposed in the lens barrel such that it can provide a zoom or focus function by moving axially in accordance with rotation track of the lens barrel; and a piezoelectric element positioned in the hollow base and touching an outer side of the lens barrel so as to generate a rotating force to drive the rotation of the lens barrel.

As regards the piezoelectrically driven optical lens, the axis of the piezoelectric element is parallel to the axis of the lens barrel, and the piezoelectric element comprises one metal tube and two piezoelectric ceramic plates. In the preferred situation, the two piezoelectric ceramic plates are spaced apart and fixedly disposed on the outer surface of the metal tube. The metal tube is made of aluminum, copper, or brass. The piezoelectric ceramic plates are monolayer plates or multilayer plates. The piezoelectric ceramic plates are subjected to polarization, coating, or cutting, depending on form and shape.

A side of the hollow base is disposed with an abutting portion abutting against the piezoelectric element, so as to provide preload required for the piezoelectric element to touch the outer side of the lens barrel. The abutting portion is a preload adjustment element, such as a screw, coupled to the side of the hollow base and pressing on an outer side the piezoelectric element. The preload required for the piezoelectric element to touch the outer side of the lens barrel is adjusted by means of the preload adjustment element. The abutting portion further comprises a buffer element disposed between the preload adjustment element and the piezoelectric element. The buffer element is exemplified by a rubber pad or an elastomer like a spring. In a preferred embodiment, a plurality of piezoelectric elements in contact with the outer side of the lens barrel can be disposed in the hollow base, and the piezoelectric elements together demonstrate rotational symmetry relative to the axis of the lens barrel. In another embodiment, a combination of the piezoelectric element and driven rollers in contact with the outer side of the lens barrel can be disposed in the hollow base and can have rotational symmetry relative to the axis of the lens barrel, though the quantity of the piezoelectric elements and the driven rollers is determined based on the application.

The outer side of the lens barrel is disposed with a frictional portion contactable with and drivable by the piezoelectric element. The frictional portion is a ring structure encircling the lens barrel. The ring structure is made of one selected from the group consisting of ceramic, metal, plastic, and wear-proof material. The lens barrel is inwardly disposed with motion track grooves. The lens system is disposed with a positioning bump corresponding in position to the motion track grooves. The lens system comprises at least one lens frame for receiving an optical lens, and the positioning bump is disposed on an outer side of the lens frame. Alternatively, the lens system can comprise a plurality of lens frames for receiving an optical lens each, the positioning bump being disposed on an outer side of each of the lens frames, and the lens barrel being inwardly disposed with a plurality of motion track grooves of a number equal to that of the lens frames. In general, the motion track grooves differ from one another.

The lens system is disposed with at least two guiding holes. The hollow base is disposed with guiding rods penetrating the guiding holes respectively. The lens system in the lens barrel moves axially along the guiding rods. The hollow base is a frame structure comprising two bases and four covers. In a preferred situation, the hollow base comprises a U-shaped base and a panel-shaped base, and the U-shaped base is formed with one base and four covers. The guiding rods are uprightly disposed on the two bases. The two bases are disposed with positioning holes for positioning the piezoelectric element.

In comparison with the prior art, the present invention discloses using a single piezoelectric element or a plurality of piezoelectric elements for driving a lens system of a lens barrel to perform the zoom or focus function, so as to achieve the goals of maximum torque and minimum volume. The components of the piezoelectric element of the present invention are structurally simple, and not only fulfill the goal of structural simplicity but also the goals of having a strong structure, and ease of fabrication. Points of positioning or insertion are specified for the parts and components of the piezoelectric element in accordance with the present invention, thus achieving the goal of ease of assembly. Accordingly, the present invention overcomes the drawbacks of the prior art and thereby has high industrial applicability.

DETAILED DESCRIPTION OF THE PREFERRED EMBODIMENTS

The following specific embodiments are provided to illustrate the present invention. Persons skilled in the art can readily gain an insight into other advantages and features of the present invention based on the contents disclosed in this specification.

Figure 1:
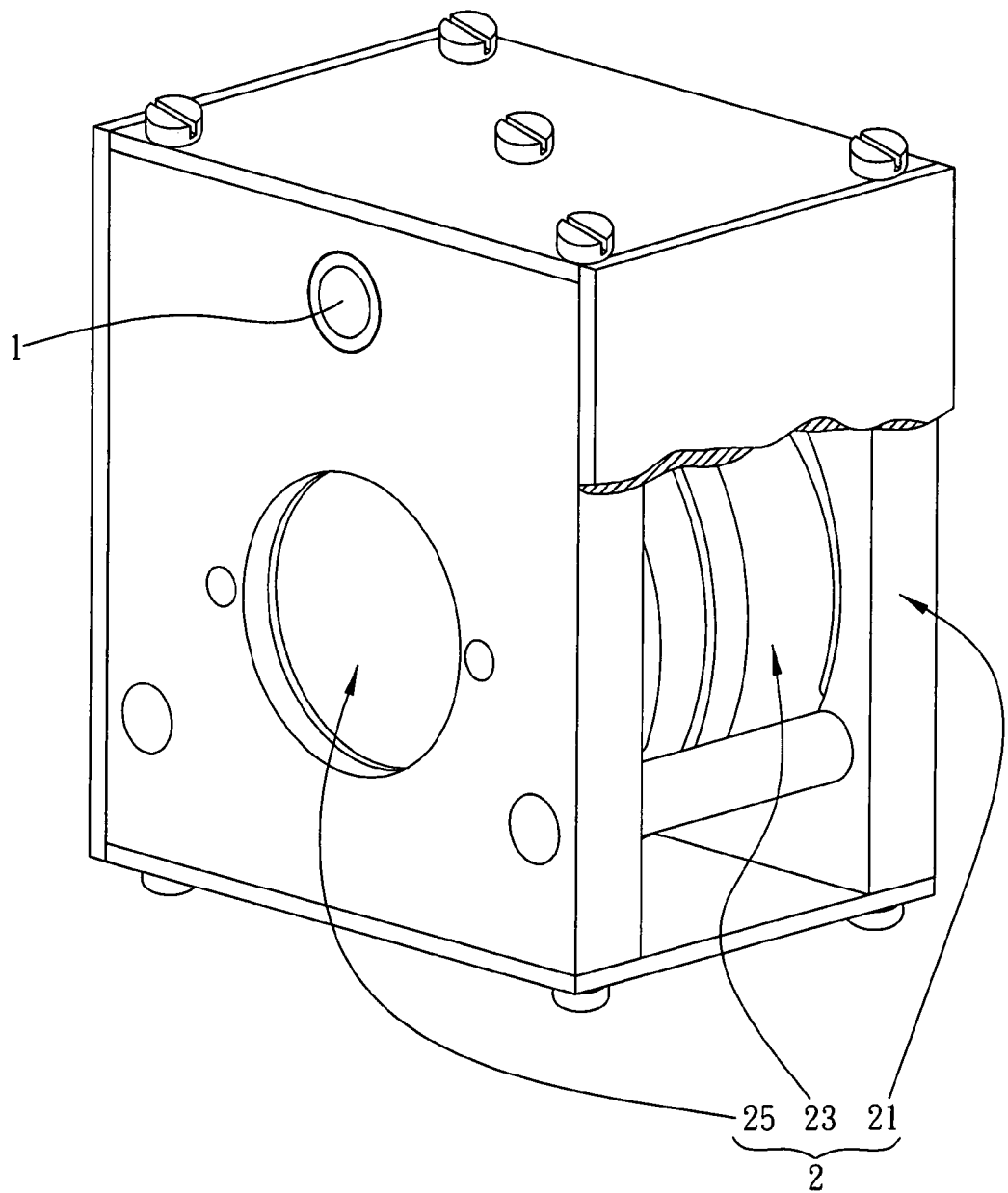
FIG. 1 is a perspective view showing the first embodiment of a piezoelectrically driven optical lens of the present invention.

Referring to FIG. 1, the present invention discloses a piezoelectrically driven optical lens comprising a lens body 2 and a piezoelectric element 1. The piezoelectric element 1 generates a rotating force. The lens body 2 comprises a hollow base 21, a lens barrel 23, and a lens system 25. The lens barrel 23 is rotatably positioned in the hollow base 21. The lens system 25 is disposed in the lens barrel 23 and performs the zoom or focus function by moving axially in accordance with rotation of the lens barrel 23. The piezoelectric element 1 is positioned in the hollow base 21 and in contact with an outer side of the lens barrel 23 so as to generate a rotating force to drive the rotation of the lens barrel 23. With the structurally simple piezoelectrically driven optical lens, a drawback of the prior art, that is, structural complexity, is overcome. In this embodiment, the longitudinal axis of the piezoelectric element 1 is parallel to the longitudinal axis of the lens barrel 23 so as to enhance the driving efficiency.

Although this embodiment discloses positioning one piezoelectric element in one lens body, other embodiments may disclose a piezoelectric element with variation in the quantity and position thereof as appropriate. In this regard, this embodiment does not limit the present invention. In addition, not only are there a wide variety of lens bodies having zoom and focus functions, but whatever lens body, comprising the hollow base 21, the lens barrel 23 rotatably positioned in the hollow base 21, and the lens system 25 disposed in the lens barrel 23 and performing the zoom or focus function by moving axially in accordance with rotation of the lens barrel 23 is applicable to the present invention. However, the inventors still put forth a workable structure of the lens body 2 with a view to allowing persons of ordinary skill in the art to implement the present invention by means of this embodiment. Hence, this embodiment is not supposed to limit the lens body 2 of the present invention.

Figure 2:
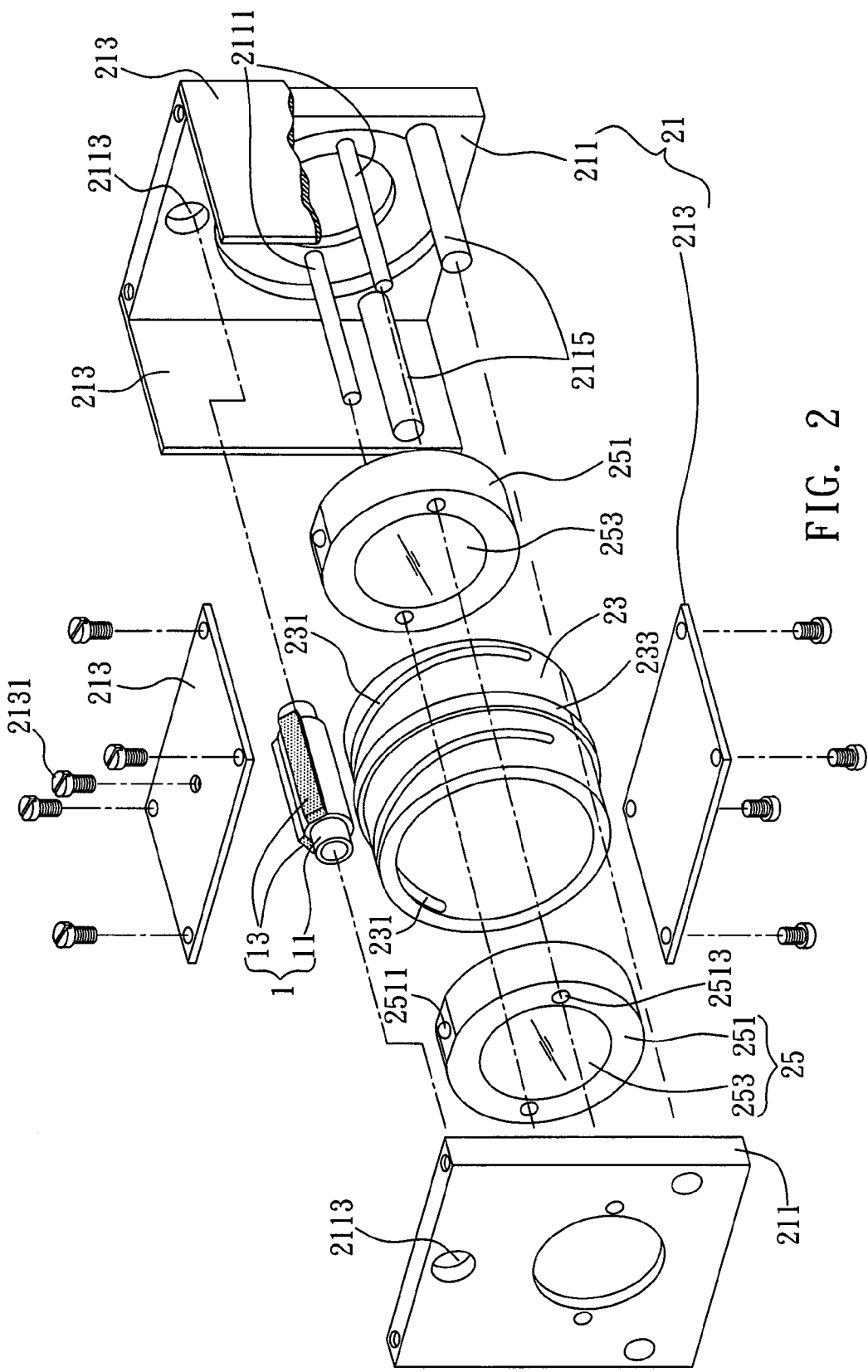
FIG. 2 is an exploded view showing the first embodiment of a piezoelectrically driven optical lens of the present invention.
Figure 3:
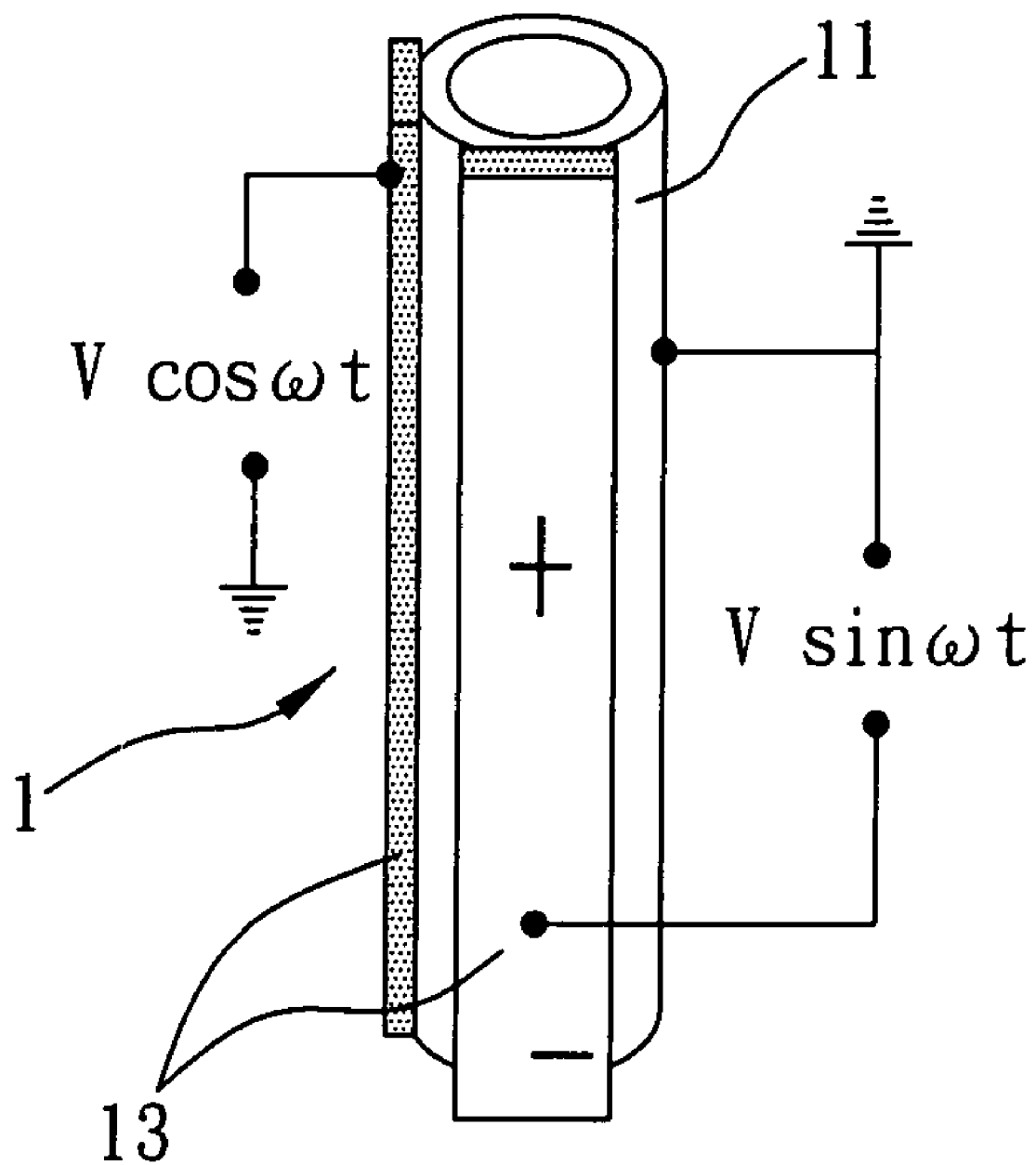
FIG. 3 is a schematic view showing a piezoelectric element for use in a piezoelectrically driven optical lens of the present invention.

FIGS. 1 to 3 illustrate the lens body 2, as well as the piezoelectric element 1 positioned in the lens body 2 and adapted to generate a rotating force.

The piezoelectric element 1 is positioned in the hollow base 21 of the lens body 2. In this embodiment, the piezoelectric element 1 comprises one metal tube 11 and two piezoelectric ceramic plates 13. The metal tube 11 is an aluminum tube or a copper tube or a copper allow (for example, a brass tube). The two piezoelectric ceramic plates 13 are spaced apart and fixedly disposed on an outer surface of the metal tube 11, forming an angle of 90 degree, for example. The piezoelectric ceramic plates 13 are monolayer plates or multilayer plates. The piezoelectric ceramic plates 13 are subjected to polarization, electrode coating, or cutting, depending on form and shape.

The metal tube 11 is connectably disposed with the negative pole of an applied electric field. The two piezoelectric ceramic plates 13 are connectably disposed with two positive poles of an applied electric field respectively. When one of the piezoelectric ceramic plates 13 is subjected to an applied voltage (for example, sine wave-driving voltage $V \sin \omega t$), the piezoelectric element 1 generates mechanical energy of high-frequency vibration because of reverse piezoelectric effect, such that it produces anticlockwise circular motion much like the motion of a hula-hoop. Conversely, when the other piezoelectric ceramic plates 13 is subjected to an applied voltage (for example, cosine wave-driving voltage $V \cos \omega t$), the piezoelectric element 1 generates mechanical energy of high-frequency vibration because of a reverse piezoelectric effect, such that it produces clockwise circular motion. In so doing, the lens barrel 23 can rotate anticlockwise and clockwise. Furthermore, the anticlockwise and clockwise rotation of the lens barrel 23 can be achieved by controlling the circular motion of the piezoelectric element 1, which, in turn, can be achieved by subjecting the two piezoelectric ceramic plates 13 using sine wave and cosine wave of different phases. Of course, it is also feasible to subject the two piezoelectric ceramic plates 13 to square waves and so on.

The lens body 2 comprises the hollow base 21, the lens barrel 23, and the lens system 25. The lens barrel 23 is rotatably positioned in the hollow base 21. The lens system 25 is disposed in the lens barrel 23 and performs the zoom or focus function by moving axially in accordance with the rotation of the lens barrel 23. In this embodiment, the hollow base 21 is a frame structure comprising two bases 211 and four covers 213. One of the bases 211 is uprightly disposed with at least two guiding rods 2111 penetrating the lens barrel 23 and is disposed with positioning holes 2113 for positioning the piezoelectric element 1. Two driven rollers 2115 are disposed between the two bases 211. The two driven rollers 2115 and the piezoelectric element 1 together demonstrate rotational symmetry relative to an axis of the lens barrel 23 and touch an outer side of the lens barrel 23. The four covers 213 are fastened or glued to four sides of the two bases 211 respectively, so as to form the hollow base 21 characterized by ease of assembly and structural simplicity. This embodiment discloses the hollow base 21, and the hollow base 21 is exemplified by a frame structure comprising the two bases 211 and the four covers 213 with a view to simplifying the fabrication process of parts and components. Nevertheless, equivalent modification of the hollow base 21 can be achieved, using a U-shaped base and a panel-shaped base. The U-shaped base is formed with one base and four covers. Likewise, the equivalent modification of the hollow base 21 is easy to assemble. Simple changes in the combination of the parts and components are apparent to persons of ordinary skill in the art.

The two bases 211 of the hollow base 21 are disposed with positioning holes 2113 for positioning the piezoelectric element 1. In other words, two ends of the metal tube 11 of the piezoelectric element 1 are positioned in the positioning holes 2113 of the two bases 211, thus providing optimal positioning and boundary conditions for the piezoelectric element 1. A side of the hollow base 21, that is, any one of the covers 213, is disposed with an abutting portion 2131 abutting against the piezoelectric element 1, so as to provide preload required for the piezoelectric element 1 to touch the outer side of the lens barrel 23. In this embodiment, the abutting portion 2131 is a preload adjustment element, such as a screw, coupled to the one of the covers 213 and pressing on an outer side the piezoelectric element 1. The preload required for the piezoelectric element 1 to touch the outer side of the lens barrel 23 is adjusted by means of the preload adjustment element.

The outer side of the lens barrel 23 is disposed with a frictional portion 233 contactable with and drivable by the piezoelectric element 1. In this embodiment, the frictional portion 233 is a ring structure encircling the lens barrel 23. The ring structure is made of one selected from the group consisting of ceramic, metal, plastic, and wear-proof material. The lens barrel 23 is inwardly disposed with helical motion track grooves 231. The lens system 25 is disposed with a positioning bump 2511 corresponding in position to the motion track grooves 231. The lens system 25 comprises at least one lens frame 251 for receiving an optical lens 253, and the positioning bump 2511 is disposed on an outer side of the lens frame 251. The lens frame 251 is disposed with two guiding holes 2513 penetrable by the two guiding rods 2111 so as to position the lens system 25 in the lens barrel 23 and axially move the lens system 25 along the guiding rods 2111.

In this embodiment, the lens system 25 comprises two lens frames 251 for receiving an optical lens 253 in each, and the lens barrel 23 is inwardly disposed with two motion track grooves 231, and the two motion track grooves 231 differ from one another, thus allowing the lens body 1 to perform the zoom or focus function. The quantity of the lens frames 251, the motion track grooves 231, and the optical lenses 253 received in the lens frames 251 depends on the zoom or focus function requirements of the optical system. In this regard, this embodiment does not limit the present invention, as variation of the quantity is apparent to persons of ordinary skill in the art.

The lens system 25 in the lens barrel 23 can only move axially in accordance with the rotation of the lens barrel 23. This is because: first, the lens barrel 23 is rotatably disposed in the hollow base 21; second, the lens system 25 in the lens barrel 23 is penetrated by the two guiding rods 2111 and thereby prevented from rotating; third, the motion track grooves 231 and the positioning bump 2511 corresponding in position thereto constrain the motion. In the presence of an applied voltage, the piezoelectric element 1 in contact with the lens barrel 23 undergoes circular motion like a hula-hoop and thereby drives the lens barrel 23 by friction, thus allowing the lens body 1 to perform the zoom or focus function.

Although this embodiment is exemplified by one piezoelectric element 1 and two driven rollers 2115 collectively disposed in the hollow base 2, touching the outer side of the lens barrel 23, and having rotational symmetry relative to the axis of the lens barrel 23, in other embodiments piezoelectric elements 1 may substitute for the driven rollers 2115 in light of the requirement for a driving force or speed. For instance, a plurality of piezoelectric elements 1 in contact with the outer side of the lens barrel 23 can be disposed in the hollow base 1. However, it is sufficient for the piezoelectric elements 1, or a combination of the piezoelectric elements 1 and the driven rollers 2115, to partially or fully encircle and contact the outer side of the lens barrel 23 in order to provide rotation and positioning functions. The spatial relationship of the piezoelectric elements 1 and the driven rollers 2115 is not limited to the aforesaid rotational symmetry relative to the axis of the lens barrel 23.

Although the piezoelectric element 1 referred to in this embodiment comprises one metal tube 11 and two piezoelectric ceramic plates 13, whatever element capable of undergoing circular motion like a hula-hoop is suitable to function as the piezoelectric element 1 referred to in the present invention. For instance, it is feasible to use a piezoelectric tube comprising a tube-shaped piezoelectric ceramic body made of lead zirconate titanate (PZT) or electrostrictive material and first, second and third electrodes, wherein the first electrode is connectably disposed with the negative pole of an applied electric field, and the second and third electrodes are connectably disposed with the positive poles of an applied electric field respectively.

Figure 4:
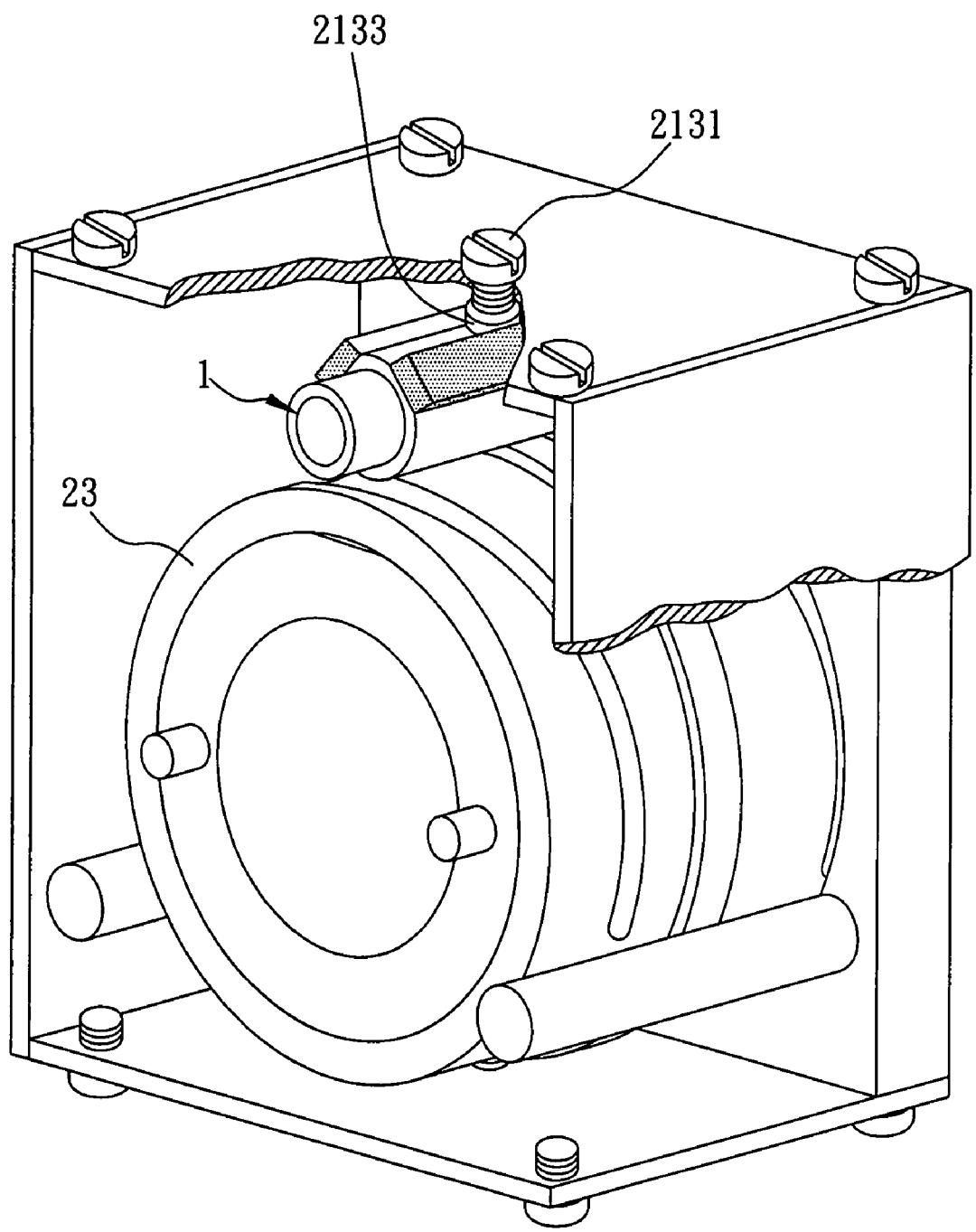
FIG. 4 is a cutaway perspective view showing part of the second embodiment of a piezoelectrically driven optical lens of the present invention.

The abutting portion 2131 referred to in this embodiment is exemplified by a preload adjustment element, such as a screw, coupled to one of the covers 213 and pressing on an outer side of the piezoelectric element 1. The preload required for the piezoelectric element 1 to touch the outer side of the lens barrel 23 is adjusted by means of the preload adjustment element. However, considering the variation in the hula-hoop-like circular motion performed by the piezoelectric element 1, the abutting portion 2131 can be disposed with an element for absorbing the variation. Referring to FIG. 4, in addition to the preload adjustment element such as a screw, the abutting portion 2131 comprises a buffer element 2133 disposed between the preload adjustment element and the piezoelectric element 1. In this embodiment, the buffer element 2133 is exemplified by a rubber pad, but other embodiments may adopt an elastomer like a spring.

Summarizing the above, the present invention discloses using a piezoelectric element to drive an optical lens with a view to implementing a piezoelectrically driven optical lens receivable in a video system, monitoring system, optical system, film camera, analog camera, digital camera, or camera phone. The piezoelectrically driven optical lens is characterized by great torque, small size, structural simplicity, strong structure, ease of production, and ease of assembly. Accordingly, the present invention overcomes the drawbacks of the prior art and meets the industrial applicability, novelty and inventiveness requirements for an invention patent.

The aforesaid embodiments merely serve as the preferred embodiment of the present invention. They should not be construed as to limit the scope of the present invention in any way. Hence, many other changes can be made in the present invention. It will be apparent to those skilled in the art that all equivalent modifications or changes made, without departing from the spirit and the technical concepts disclosed by the present invention, should fall within the scope of the appended claims.

What is claimed is:

1. A piezoelectrically driven optical lens, comprising:
a lens body having a hollow base, a lens barrel, and a lens system, the lens barrel being rotatably positioned in the hollow base, and the lens system being disposed in the lens barrel and performing one of a zoom function and a focus function by moving axially in accordance with rotation of the lens barrel; and
a piezoelectric element positioned in the hollow base and touching an outer side of the lens barrel so as to generate a rotating force to drive the rotation of the lens barrel, the piezoelectric element comprising one metal tube and two piezoelectric ceramic plates spaced apart and fixedly disposed on an outer surface of the metal tube.

2. The piezoelectrically driven optical lens of claim 1, wherein an axis of the piezoelectric element is parallel to an axis of the lens barrel.

3. The piezoelectrically driven optical lens of claim 1, wherein the metal tube is one of an aluminum tube and a copper tube.

4. The piezoelectrically driven optical lens of claim 3, wherein the copper tube is substituted with a brass tube.

5. The piezoelectrically driven optical lens of claim 1, wherein the piezoelectric ceramic plate is one of a monolayer plate and a multilayer plate.

6. The piezoelectrically driven optical lens of claim 1, wherein the piezoelectric ceramic plate is subjected to a process selected from the group consisting of polarization, electrode coating, and cutting, depending on form and shape.

7. The piezoelectrically driven optical lens of claim 1, wherein a side of the hollow base is disposed with an abutting portion abutting against the piezoelectric element to provide preload required for the piezoelectric element to touch the outer side of the lens barrel.

8. The piezoelectrically driven optical lens of claim 7, wherein the abutting portion comprises a preload adjustment element coupled to the side of the hollow base and pressing on an outer side of the piezoelectric element.

9. The piezoelectrically driven optical lens of claim 8, wherein the preload adjustment element is a screw.

10. The piezoelectrically driven optical lens of claim 8, wherein the abutting portion further comprises a buffer element disposed between the preload adjustment element and the piezoelectric element.

11. The piezoelectrically driven optical lens of claim 10, wherein the buffer element is one selected from the group consisting of a spring, rubber, and elastomer.

12. The piezoelectrically driven optical lens of claim 1, wherein the outer side of the lens barrel of the lens body is disposed with a fictional portion contactable with and drivable by the piezoelectric element.

13. The piezoelectrically driven optical lens of claim 12, wherein the fictional portion is a ring structure encircling the lens barrel.

14. The piezoelectrically driven optical lens of claim 13, wherein the ring structure is made of a material selected from the group consisting of ceramic, metal, plastic, and wear-proof material and the lens system is disposed with at least two guiding holes and the hollow base with guiding rods penetrating the guiding holes respectively so as to position the lens system in the lens barrel and axially move the lens system along the guiding rods.

15. The piezoelectrically driven optical lens of claim 14, wherein the hollow base is a frame structure comprising two bases and four covers, the bases being uprightly disposed with the guiding rods and being disposed with positioning holes for positioning the piezoelectric element.

16. The piezoelectrically driven optical lens of claim 1 further comprising a plurality of piezoelectric elements positioned in the hollow base and touching the outer side of the lens barrel.

17. The piezoelectrically driven optical lens of claim 16, wherein the piezoelectric elements have rotational symmetry relative to an axis of the lens barrel.

18. The piezoelectrically driven optical lens of claim 1 further comprising a piezoelectric element and driven rollers positioned in the hollow base and touching the outer side of the lens barrel, the piezoelectric element and the driven rollers together having rotational symmetry relative to an axis of the lens barrel.

19. The piezoelectrically driven optical lens of claim 1, wherein the lens barrel is inwardly disposed with motion track grooves, and the lens system is disposed with a positioning bump corresponding in position to the motion track grooves.

20. The piezoelectrically driven optical lens of claim 19, wherein the lens system comprises at least one lens frame for receiving an optical lens, and the positioning bump is disposed on an outer side of the lens frame.

21. The piezoelectrically driven optical lens of claim 19, wherein the lens system comprises a plurality of lens frames for receiving an optical lens each, the positioning bump is disposed on an outer side of each of the lens frames, and the lens barrel is inwardly disposed with a number of motion track grooves equal to that of the lens frames.

22. The piezoelectrically driven optical lens of claim 21, wherein the motion track grooves differ from one another.

* * * * *